United States Patent
Polando, Jr. et al.

(10) Patent No.: US 11,218,513 B2
(45) Date of Patent: Jan. 4, 2022

(54) INFORMATION SHARING WITH ENHANCED SECURITY

(71) Applicant: BAE Systems Information and Electronic Systems Integration Inc., Nashua, NH (US)

(72) Inventors: Kenneth A. Polando, Jr., South Riding, VA (US); Michael J. Gale, Bedford, MA (US); Tara B. Jennings, Malta, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 309 days.

(21) Appl. No.: 16/419,765

(22) Filed: May 22, 2019

(65) Prior Publication Data

US 2020/0374318 A1 Nov. 26, 2020

(51) Int. Cl.
  *H04L 29/06* (2006.01)
(52) U.S. Cl.
  CPC ........ *H04L 63/205* (2013.01); *H04L 63/0263* (2013.01); *H04L 63/0471* (2013.01); *H04L 63/0209* (2013.01)
(58) Field of Classification Search
  CPC .............. H04L 63/205; H04L 63/0471; H04L 63/0263; H04L 63/0209; H04L 63/0428
  See application file for complete search history.

(56) References Cited

U.S. PATENT DOCUMENTS

| | | | | |
|---|---|---|---|---|
| 7,299,408 | B1* | 11/2007 | Daconta | G06Q 40/025 715/234 |
| 9,053,124 | B1* | 6/2015 | Dornquast | G06F 11/1453 |
| 2012/0023193 | A1* | 1/2012 | Eisner | H04L 67/28 709/217 |
| 2013/0304712 | A1* | 11/2013 | Meijer | H04N 21/2365 707/694 |
| 2014/0372460 | A1* | 12/2014 | Joy | G06F 16/26 707/755 |
| 2016/0028692 | A1* | 1/2016 | Gluck | H04L 63/0245 726/11 |
| 2020/0210401 | A1* | 7/2020 | Swami | G06F 16/2365 |

* cited by examiner

*Primary Examiner* — J. Brant Murphy
(74) *Attorney, Agent, or Firm* — Finch & Maloney PLLC; Scott J. Asmus

(57) ABSTRACT

Techniques are disclosed for providing information sharing with enhanced security. In an embodiment, a secure information sharing engine provides secure sharing of data by applying one or more validation rules to the data. When applied to a given portion of the data, the validation rule verifies that the data of the given portion is, in fact, the data that is supposed to be in the given portion. At least one of the validation rules includes a check that a portion of the data contained in multiple fields maintain a relationship between the multiple fields. If the data passes the applied one or more validation rules, the secure information sharing engine allows the sharing of the data. Otherwise, if the data does not pass the one or more applied validation rules, the secure information sharing engine disallows the sharing of the data.

22 Claims, 4 Drawing Sheets

INFORMATION SHARING WITH ENHANCED SECURITY

STATEMENT OF GOVERNMENT INTEREST

This invention was made with United States Government assistance under Contract No. FA 8750-17-C-0065 awarded by the U.S. Air Force. The United States Government has certain rights in this invention.

FIELD OF THE DISCLOSURE

This disclosure relates generally to information sharing, and more particularly, to information sharing with enhanced security.

BACKGROUND

Today, information sharing is an essential part of many commercial and government applications. For example, in the context of a government application, agencies may need to communicate mission-critical information to persons and organizations while ensuring the security of the information that is being shared with authorized recipients. Oftentimes, the information being shared is of a sensitive nature, and the communication may be across different domains. However, without adequate security protections and access controls, sharing of highly useful but sensitive information may not be possible because of the risk of information leakage to inappropriate or unauthorized parties.

Figure 1:
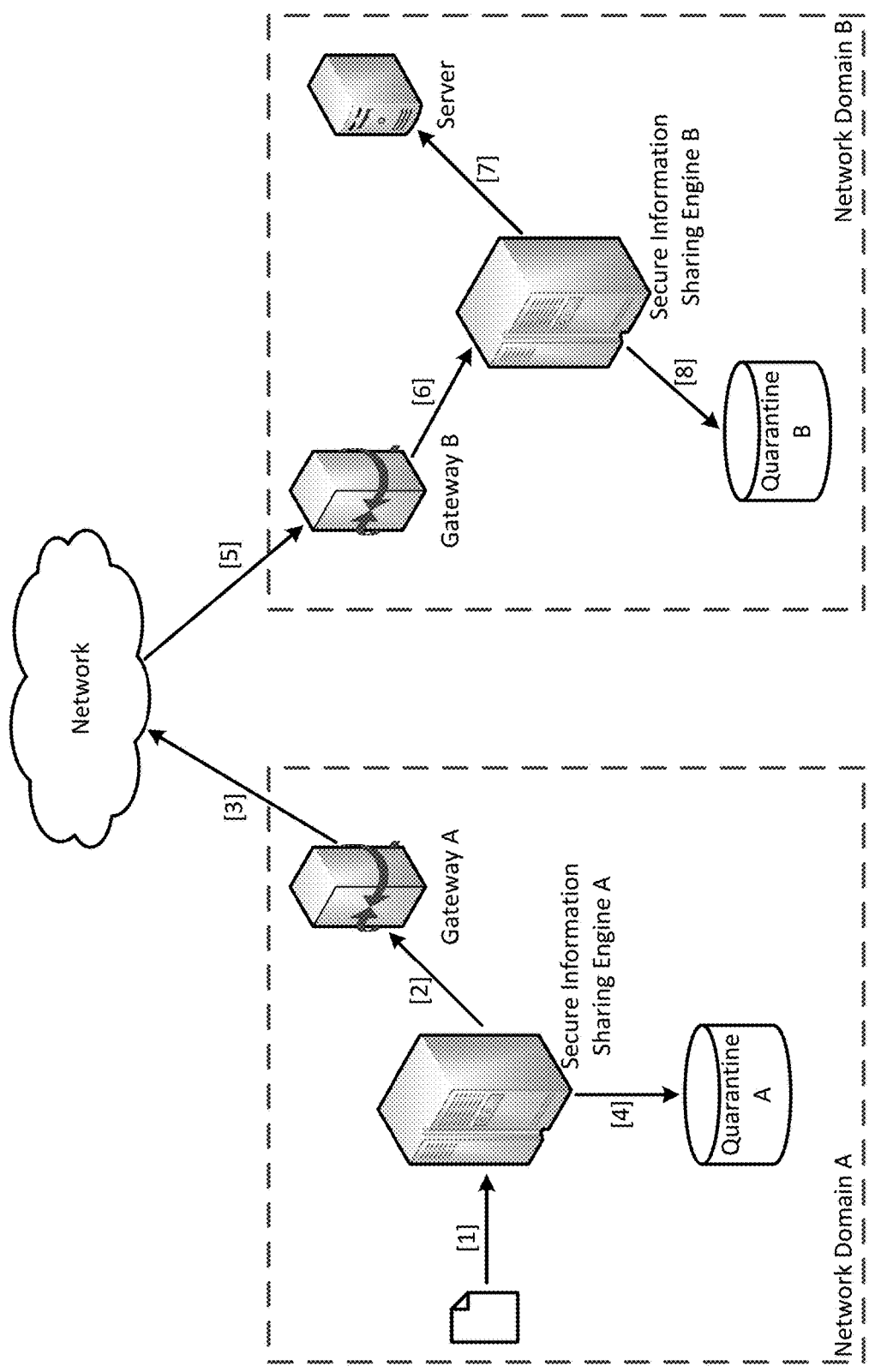
FIG. 1 is a diagram illustrating an example secure process flow for secure information sharing between two network domains A and B, in accordance with an embodiment of the present disclosure.

These and other features of the present embodiments will be understood better by reading the following detailed description, taken together with the figures herein described.

DETAILED DESCRIPTION

Given the recognized benefits of maintaining the security and integrity of information, significant resources have been devoted to developing data security technologies to prevent information leakage to inappropriate or unauthorized parties. While secure and reliable digital communications technologies are now widely available, it is important to recognize that information should also be secured at other points in the virtual information sharing process that extends from information creation to dissemination. For example, prior to actual communication of the information, the decision with respect to whether to share, what to share, and with whom to share, information can be paramount to maintaining the security and integrity of the information. In the context of classified information, this decision commonly relies on the use of tagged data fields. For example, a field in a form or a report may be associated with a tag that indicates that the field contains unclassified (or classified) information. Relying on this tag, a decision may be made to share the information contained in the field. However, a person completing the report may have knowingly or unknowingly filled out the field tagged as unclassified with classified information. In the case of an unscrupulous or malicious person, he or she may even change or alter the tag itself (e.g., change a tag indicating classified information to indicate unclassified information). Similarly, the entire report can be associated with a tag that indicates the level of classification of the information contained in the report. As with individually tagged fields, information of higher classification can be placed into the report tagged as being of lower classification, or the tag itself may be altered. In such cases, basing the information sharing decision (whether to share and with whom to share) based on a literal check of such tags increases the risk of information leakage to inappropriate or unauthorized parties. Moreover, this risk is not confined to the sharing of classified information but also applicable to information in the general sense in that many information sharing decisions are based on such tags (e.g., recipient lists, access control lists, permissions, etc.) associated with the information. Additionally, when shared in combination, multiple unclassified fields may aggregate to a higher level of classification than unclassified, and this needs to be evaluated to ensure secure information sharing.

Thus, and in accordance with an embodiment of the present disclosure, techniques for information sharing with enhanced security are disclosed. The information may be, for example, contained in a document, data packet, block of data, or any other type of transferrable data. The information can be shared within an information domain and/or across information domains. In one example embodiment, the techniques are implemented in the context of a secure information sharing policy logic engine or service (sometimes referred to herein more simply as a "secure information sharing engine"), one instance of which is executing within the information sender or originator domain and another instance of which is executing within the information recipient or consumer domain. In such example embodiments, a user, such as a system administrator, configures the secure information sharing engine at the originator domain to validate that data can be shared prior to permitting the sharing of the data, for example, with the receiver domain. Likewise, a user, such as a system administrator, configures the secure information sharing engine at the receiver domain to validate that received data can be shared prior to allowing the received data to be shared within the receiver domain. In both the sender and receiver domains, the secure information sharing engine is configured to perform one or more comprehensive semantic and/or mathematical checks on the data to validate that the data can be shared. In one such embodiment, the comprehensive semantic and/or mathematical check is specified in the form of a validation rule that is executed or applied to the data.

By way of an example use scenario, and in accordance with an embodiment of the present disclosure, consider a context in which documents are to be shared from a secure domain, such as a secure network domain, to an unsecure domain, such as an unsecure network domain. The example use scenario assumes the existence of an agreement that documents, such as documents with defined content, can be shared from the secure network domain to the unsecure network domain. To facilitate such secure document sharing or so-called trusted downloading between the two domains, a first secure information sharing engine is configured to execute within the secure network domain and a second secure information sharing engine is configured to execute within the unsecure network domain. For example, in one such embodiment, an administrator of the secure network domain can establish validation rules for validating the documents for sharing with the unsecure network domain. In other embodiments, some of the validation rules can be pre-established. In any case, such rules may be executed against the data contained in one of the documents to verify that the data is, in fact, the data that is supposed to be in the document. As an example, a validation rule can check that the information contained in a field is valid or otherwise appropriate for that field. By way of only one example, such a validation rule can check that the number contained in a field labeled or denoted "Latitude" is between a pair of numerical values, such as between −90 and 90. In some example cases, this validation rule can also check that the number contained in the field includes a reasonable number of decimal places, such as two, three, four, or any other number suitable for designating a geographic coordinate. As another example, a relationship may be known to exist between multiple fields and/or documents, and a validation rule can check that the information contained in the multiple fields and/or documents maintains the relationship. By way of only one example, it may be the case that multiple documents are to be shared, where each document includes a field that is related to a field in another document. In such example cases, a validation rule can check that the data contained in the multiple fields maintain the combinational relationship. In the case of a mathematical relationship between two or more fields, a validation rule can check that the data contained in the two or more fields maintain the mathematical relationship. As yet another example, a validation rule can check that the information contained in a field is valid or otherwise appropriate for that field based on an aggregation of previously obtained information. In a general sense, it will be appreciated in light of this disclosure that a wide variation of validation rules can be generated that operate on the data contained in one or more of the documents to validate the information in the document. It will also be appreciated in light of this disclosure that the number of validation rules generated can vary from a small number of validation rules, such as three, five, or ten, to a large number of validation rules, such as 100, 200, 500, or even a larger number.

Referring still to the example use scenario, the administrator of the secure network domain can then configure the first secure information sharing engine to receive the documents for sharing with the unsecure network domain and, for each received document, apply one or more appropriate validation rules to validate that the document can be shared. In some such embodiments, the administrator can configure the first secure information sharing engine to send or otherwise download the documents that pass the applied validation rules to the second secure information sharing engine. In such embodiments, the administrator can also configure the first secure information sharing engine to not send the documents that fail any one of the applied validation rules. In one embodiment, the documents can be encrypted prior to sending or downloading to the second secure information sharing engine.

In a like manner, an administrator of the unsecure network domain can establish validation rules for validating the documents received from the secure network domain prior to allowing the documents to be shared within the unsecure network domain. As noted, in some embodiments, some of the validation rules may be pre-established. In some example cases, these validation rules may be different, in the sense that there is not a one-to-one correspondence, from the validation rules established in the secure network domain. In other cases, these validation rules may be the same as the validation rules established in the secure network domain. In any case, similar to the validation rules in the secure network domain, the established validation rules may be executed against the data contained in one of the documents to verify that the data is, in fact, the data that is supposed to be in the document. The administrator can then configure the second secure information sharing engine to receive the documents from the first information sharing engine and, for each received or downloaded document, apply one or more appropriate validation rules to validate that the document can be shared within the unsecure network domain. In such embodiments, the administrator can also configure the second secure information sharing engine to prevent the sharing of documents that fail any one of the applied validation rules. The sharing of documents in the above example is used for illustrative purposes only and any type of data may be shared and validated using comprehensive semantic and/or mathematical means.

The disclosed techniques provide numerous advantages over other information sharing techniques. For example, and according to an embodiment, the techniques employ validation rules that are applied to the communicated data to allow (or disallow) the sharing of the data. Thus, unlike mere checks of tagged data fields, a secure information sharing engine according to an embodiment of the present disclosure bases the information sharing decision on validation of the data, thus making it very difficult, if not impossible, for a bad actor or agent to manipulate the data in such a way as to pass the applied validation checks. In addition, in some such embodiments, the disclosed techniques do not require additional data, such as tags or metadata to determine whether to allow (or disallow) the sharing of the data. Also, the disclosed techniques, according to some embodiments, validate relationships between multiple data fields, thus providing higher information integrity and significantly less chance of information leakage. These and other advantages and alternative embodiments will be apparent in light of this disclosure.

As used herein, the concept of sharing data between network domains refers to the sharing of a collection of information or otherwise represents sharing information in the form of any data between a sender and a receiver as disclosed herein. In some cases, the shared data may represent a stream of information. The data can contain structured and/or unstructured data. In the case of structured data, the data may be arranged or otherwise included in one or more fields, where each field may have a fixed or known location and a specified field type, as defined by a schema, for instance. In the case of unstructured data, the data is not organized in a pre-defined manner. Thus, it will be appreciated that the shared data can include structured data, unstructured data, or both structured and unstructured data. Examples of shared data may include JavaScript Object Notation (JSON) data, Extensible Markup Language (XML) data, software programs, files pertaining to the operation of a computer system or processor, and document sharing. Examples of such documents include various types of reports, forms, agreements, and contracts. The shared data may be communicated amongst senders and receivers by a variety of techniques including wired and/or wireless transmission. As will be appreciated in light of this disclosure, and according to some embodiments, validation of the structured data can be performed to verify the security and integrity of the data for sharing.

As used herein, the term "validation rule" is a comprehensive constraint (e.g., semantic, mathematical, combinational, multi-field, multi-document, etc.) on the data. For example, the comprehensive constraint may be on a single data entity, data entities in combination, and relationships between data entities, to provide a few examples. When applied to a document, the validation rules may verify that the data is, in fact, the data that is supposed to be in the document. Similarly, when applied to a specific field or fields in a document or other type of data, the validation rules verify that the data is, in fact, the data that is supposed to be in that specific field or fields. In a more general sense, the validation rules verify the security and integrity of the data for sharing with one or more recipients.

System Architecture

FIG. 1 is a diagram illustrating an example process flow for secure information sharing between two network domains A and B, in accordance with an embodiment of the present disclosure. For example, network domain A may include a private secure network and network domain B may include a public unsecure network. In this example case, a secure information sharing engine A may execute within network domain A and a secure information sharing engine B may execute within network domain B, and work in conjunction to provide secure information sharing (so-called trusted downloading) between network domain A and network domain B. As shown in FIG. 1, network domain A and network domain B are coupled or operably connected via a network, such as a wide area network, the Internet, and/or other wired or wireless networks.

In operation, secure information sharing engine A may receive or otherwise be provided data that is to be shared with network domain B [1]. In an example use scenario, a user within network domain A may want to share a document with, or otherwise download the document to, network domain B. To do so, the user, using a suitable computing device, may logon to secure information sharing engine A and submit the document for sharing with network domain B. In response to receipt of the document, secure information sharing engine A validates the document for sharing with network domain B. For example, and according to an embodiment, secure information sharing engine A can validate the document by applying one or more validation rules against the data contained in the document. In some such embodiments, secure information sharing engine A can determine what validation rules to apply based on the document's document type. In any such cases, if the document is validated for sharing (e.g., the document passes applied validation rules), secure information sharing engine A sends the document to a gateway A for downloading to network domain B [3]. For example, gateway A may be a network node that provides interoperability between network domain A and the network. In response to receiving the document from secure information sharing engine A, gateway A can download the document to network domain B via the network, for instance [3]. In some embodiments, gateway A can encrypt the document and download the encrypted document to network domain B. In such embodiments, the encryption may be performed, for example, using symmetric key encryption such as that specified by the Advanced Encryption Standard (AES), Triple Data Encryption Standard (3DES), or any other suitable encryption technique. Otherwise, if the document fails or is otherwise not validated for sharing (e.g., the document does not pass the applied validation rules), secure information sharing engine A quarantines the failed document [4]. For example, the failed document can be quarantined by storing in a secure data store for subsequent analysis. In some embodiments, secure information sharing engine A can encrypt the failed document and quarantine the encrypted document. In the case of failure, the document is not sent to gateway A for downloading to network domain B.

Referring still to the example process flow illustrated in FIG. 1, a gateway B receives the document downloaded by gateway A [5]. For example, similar to gateway A, gateway B may be a network node within network domain B that provides interoperability between network domain B and the network. In response to receiving the document, gateway B sends the document to secure information sharing engine B [6]. In such embodiments where the received document is an encrypted document, gateway B can decrypt the encrypted document, and send the decrypted document to secure information sharing engine B. In response to receipt of the document, secure information sharing engine B validates the document for sharing within network domain B. For example, and according to an embodiment, secure information sharing engine B can validate the document by applying one or more validation rules against the data contained in the document. In some embodiments, secure information sharing engine B can determine what validation rules to apply based on the document's document type. In any such cases, if the document is validated for sharing (e.g., the document passes applied validation rules), secure information sharing engine B can send the document to a document sharing server [7]. For example, the document sharing server may facilitate the sharing of the document within network domain B. Otherwise, if the document fails or is otherwise not validated for sharing (e.g., the document does not pass the applied validation rules), secure information sharing engine B quarantines the failed document [8]. For example, the failed document can be quarantined by storing in a secure data store for subsequent analysis. In some embodiments, secure information sharing engine B can encrypt the failed document and quarantine the encrypted document. In the case of failure, the document downloaded from network domain A is not provided for sharing within network domain B. The sharing of a document in the above example is used for illustrative purposes only and any type of data (JSON, XML, etc.) may be shared and validated between network domain A and network domain B according to any of the embodiments herein.

The number of network domains and networks depicted in FIG. 1 is for illustration and it will be appreciated in light of this disclosure that there may be a different number of network domains. For example, there may be a larger, even significantly larger, number of network domains configured for secure information sharing (so-called trusted downloading) than that shown in FIG. 1. For instance, network domain A can be configured to provide secure information sharing with one, two, three, or more network domains in addition to network domain B such that validated data is downloaded from network domain A to all of the network domains configured for secure information sharing with network domain A. The secure information sharing may also be from network domain B to network domain A. Also, the secure information sharing need not be only from a secure network domain to an unsecure network domain or from a private network domain to a public network domain but may be from any network domain to another network domain or multiple network domains, or even within a single network domain. As will be appreciated, numerous configurations of network domains can be implemented and the present disclosure is not intended to be limited to any particular one.

Figure 2:
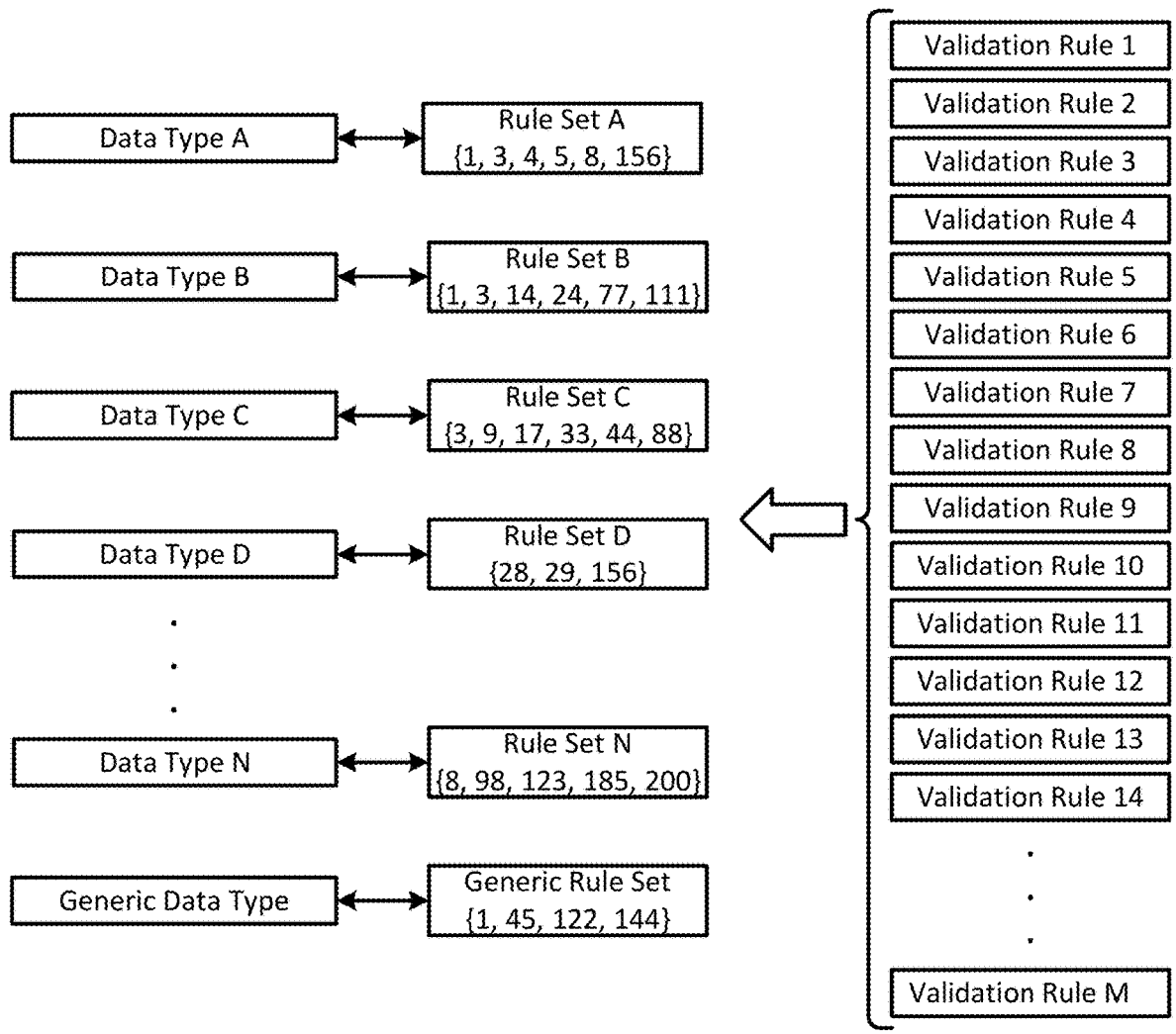
FIG. 2 is a diagram illustrating example mappings of data types and associated validation rule sets, in accordance with an embodiment of the present disclosure.

FIG. 2 is a diagram illustrating example mappings of data types and associated validation rule sets, in accordance with an embodiment of the present disclosure. The data type identifies or otherwise specifies the structure of the given data, and data that conforms to a specific data type presents information in a standard format specified for that specific data type. For example, the standard format for a particular document type may specify that certain data be arranged or otherwise be included in various fields at fixed or known locations within the document. Examples of document types may include various types of status reports, tracking reports, intelligence reports, defense handbooks, specification documents, standards documents, military specifications, contracts, intelligence records, and personnel records, to name a few examples. A document that has no structure or that does not conform to a recognized document type can be classified or categorized as conforming to a generic document type. The data type does not need to be related to a document. For example, in some embodiments, the data type defines a particular XML or JMOL structure having any number of data fields or data entries. In any case, for each data type, the mappings identify a rule set that includes one or more validation rules.

As shown, there are M validation rules (e.g., validation rule 1 through validation rule M) and N+1 data types (e.g., data type A through data type N and a generic data type). As explained above, a validation rule, according to some embodiments, is a comprehensive constraint that, when applied to the data, verifies that the data is, in fact, the data that is supposed to be present. Some validation rules may be relatively simple in that they are a semantic validation of the contents of a field in the data. By way of an example, a validation rule can check that the data contained in a field that is to contain basic data types, such as integer, character string, decimal number to a specified number of decimal places, to name a few examples, does in fact contain data of the specified type. As another example, a validation rule can check that the number contained in a field labeled or denoted "Latitude" is between a pair of numerical values, such as between −90 and 90. The same or another validation rule can further check that the number contained in such a field includes a reasonable number of decimal places, such as two, three, four, or any other number suitable for designating a geographic coordinate.

Other validation rules can be relatively more complex in that they are a validation of the contents of multiple fields in the data. For example, it may be the case that a relationship exists between multiple fields in the data, and a validation rule can check that the data contained in such fields maintain the relationship. By way of an example, a field may be included multiple times in a document, such as on each page of the document, and a validation rule can check that the data contained in the multiple fields all match. As another example, a first field may be labeled "start date" and a second field may be labeled "end date", and a validation rule can check that the date contained in the "start date" field is an earlier date than the date contained in the "end date" field.

It may also be the case that a mathematical relationship exists between multiple fields in the data, and a validation rule can check that the data contained in such fields maintain the mathematical relationship. By way of an example, suppose that data related to a satellite tracking report includes a field labeled "acceleration" and another field labeled "velocity." In this example case, a validation rule can check the number contained in the "acceleration" field is small compared to the number contained in the "velocity" field. That is, the validation rule can check to ensure that the values contained in the "acceleration" field and the "velocity" field are correct relative to each other. As another example, data related to a satellite tracking report may include a first field for the number of earth revolutions per day, a second field for the current day, a third field for the satellite launch day, a fourth field for the average speed of the satellite, and a fifth field for the total number of earth revolutions completed by the satellite. As will be appreciated in light of this disclosure, there are a finite number of mathematical combinations of possible values for the aforementioned five fields, and a validation rule can check for a mathematical combination of possible values. For example, a validation rule can check that the total number of earth revolutions is approximately the number of earth revolutions per day multiplied by the number of days the satellite has been in space. Another validation rule can check that the number of revolutions per day matches the average speed. As yet another example, the data may include three fields for probability vector values, and a validation rule can check that the values contained in these three fields sum to one.

Still other validation rules can be based on data aggregated over multiple data instances. By way of an example, suppose a first set of sharable data includes a field labeled "Latitude" that is to contain a decimal number that includes six digits past the decimal (e.g., 10.123456). Here, based on an aggregation of a sufficient number of values in the "Latitude" field across other datasets, the distribution of the values in the $6^{th}$ decimal place of such aggregated values can be determined to be a random distribution. In this example case, the decimal number contained in the "Latitude" field in previous instances of this data can be aggregated, and a validation rule can check that the $6^{th}$ decimal place of a decimal number contained in the "Latitude" field matches or otherwise sufficiently adheres to the random distribution. For example, and according to an embodiment, the match can be determined based on a comparison to a probability distribution using a suitable probability function such as the Kolmogorov-Smirnov test or any other suitable probability distribution function. It will be appreciated in light of this disclosure that a wide variation of validation rules can be generated that operate on the data to validate the data for secure information sharing.

As can be further seen in FIG. 2, data type A is mapped to a rule set A that includes validation rules 1, 3, 4, 5, 8, and 156, data type B is mapped to a rule set B that includes validation rules 1, 3, 14, 24, 77, and 111, data type C is mapped to a rule set C that includes validation rules 3, 9, 17, 33, 44, and 88, data type D is mapped to a rule set D that includes validation rules 28, 29, and 156, data type N is mapped to a rule set N that includes validation rules 8, 98, 123, 185, and 200, and the generic data type is mapped to a generic rule set that includes validation rules 1, 45, 122, and 144. Thus, in this example case, data that matches data type A is validated for sharing using the validation rules in rule set A (e.g., validation rules 1, 3, 4, 5, 8, and 156), data that matches data type B is validated for sharing using the validation rules in rule set B (e.g., validation rules 1, 3, 14, 24, 77, and 111), and so forth. In an example embodiment, the generic rule set can also be used to validate data that belongs to a recognized or identifiable data type. For instance, in such embodiments, data of data type H is validated for sharing using both the validation rules in rule set H and the validation rules in the generic rule set.

The number of validation rules, data types, and validation rules included in each rule set depicted in FIG. 2 is for illustration, and it will be appreciated in light of this disclosure that there may be a different number of validation rules, data types, and/or validation rules included in each rule set. For example, there may be a smaller or larger, even significantly larger, number of validation rules than shown. There also may be a smaller or larger number of data types than shown. Also, the validation rules included in each rule set may be different than those shown. Moreover, a validation rule may be included in in different rule sets than shown, and a validation rule may be included in none, one, or more rules sets.

Figure 3:
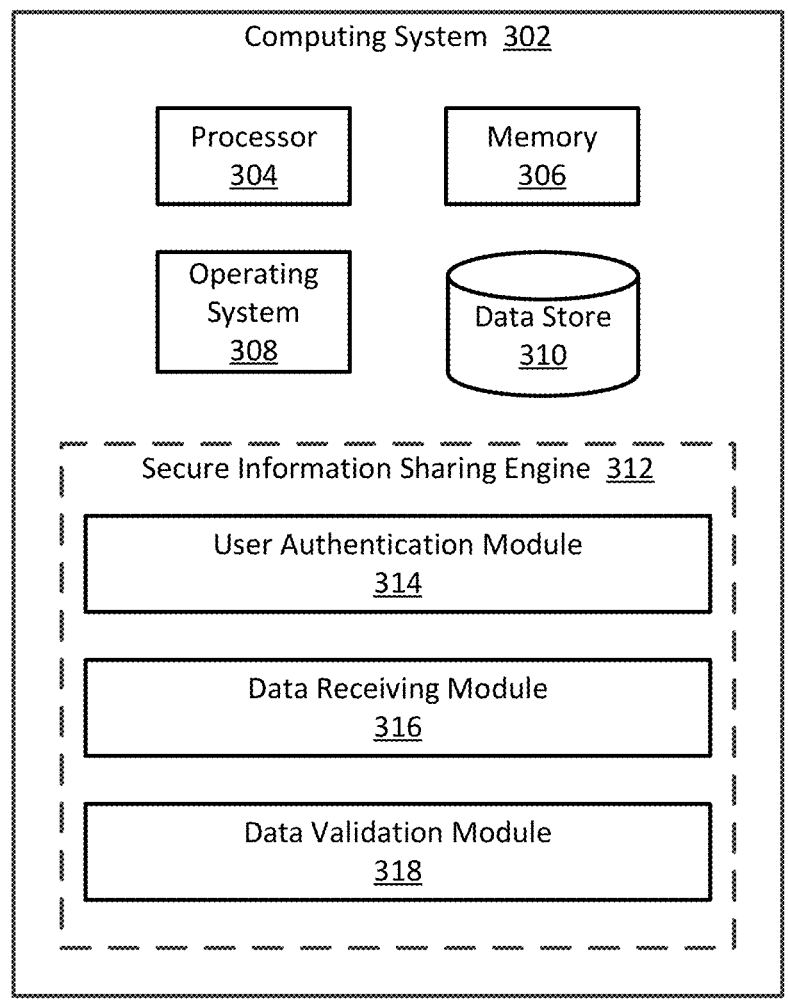
FIG. 3 is a block diagram illustrating selected components of an example computing system that is programmed with or otherwise includes a secure information sharing engine, in accordance with an embodiment of the present disclosure.

FIG. 3 is a block diagram illustrating selected components of an example computing system 302 that is programmed with or otherwise includes a secure information sharing engine, in accordance with an embodiment of the present disclosure. In some embodiments, computing system 302 is a computer system, such as a workstation, desktop computer, server, or other form of computing or telecommunication system or device that is capable of communication and that has sufficient processing power and memory capacity to perform the operations described in this disclosure. In some embodiments, a distributed computational system is provided comprising multiple of such computing systems. As shown in FIG. 3, computing system 302 includes a processor 304, a memory 306, an operating system 308, a data store 310, and a secure information sharing engine 312. In various embodiments, additional components (not illustrated, such as a display, communication interface, input/output interface, etc.) or a subset of the illustrated components can be employed without deviating from the scope of the present disclosure.

Processor 304 may be designed to control the operations of the various other components of computing system 302. Processor 304 may include any processing unit suitable for use in computing system 302, such as a single core or multi-core processor. In general, processor 304 may include any suitable special-purpose or general-purpose computer, computing entity, or computing or processing device including various computer hardware, or firmware, and may be configured to execute instructions, such as program instructions, stored on any applicable computer-readable storage media. For example, processor 304 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 3, processor 304 may include any number of processors and/or processor cores configured to, individually or collectively, perform or direct performance of any number of operations described in the present disclosure.

Memory 306 may include computer-readable storage media configured for carrying or having computer-executable instructions or data structures stored thereon. Such computer-readable storage media may include any available media that may be accessed by a general-purpose or special-purpose computer, such as processor 304. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Operating system 308 may comprise any suitable operating system, such as UNIX®, LINUX®, MICROSOFT® WINDOWS® (Microsoft Corp., Redmond, Wash.), GOOGLE® ANDROID™ (Google Inc., Mountain View, Calif.), APPLE® iOS (Apple Inc., Cupertino, Calif.), or APPLE® OS X® (Apple Inc., Cupertino, Calif.). As will be appreciated in light of this disclosure, the techniques provided herein can be implemented without regard to the particular operating system provided in conjunction with computing system 302, and therefore may also be implemented using any suitable existing or subsequently developed platform.

Data store 310 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 306, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Data store 310 may be provided on computing system 302 or provided separately or remotely from computing system 302.

As further shown in FIG. 3, secure information sharing engine 312 includes a user authentication module 314, data receiving module 316, and data validation module 318. Secure information sharing engine 312 is configured to generally provide the overall control of the information sharing with enhanced security (so-called trusted downloading) utilizing the services and functionality of user authentication module 314, data receiving module 316, data validation module 318, and other modules and components as necessary. In some embodiments, secure information sharing engine 312 is also configured to facilitate or otherwise allow configuration of secure information sharing engine 312. For example, in some such embodiments, secure information sharing engine 312 can provide configuration tools with which an authorized user, such as a system administrator, can identify or otherwise specify the data types that can be shared, identify or otherwise specify a rule set for each data type, and/or identify or otherwise specify the validation rules to include in a rule set or rule sets. In other embodiments, secure information sharing engine 312 may also provide tools with which an authorized user can create a validation rule or validation rules.

User authentication module 314 is configured to perform a user authentication process. In one embodiment, the user authentication process authenticates login or other secure access requests received from users of secure information sharing engine 312. Such authentication can be based on, for example, receipt of a user identification and password. As will be appreciated in light of this disclosure, the techniques provided herein can be implemented without regard to the particular user authentication framework provided in conjunction with secure information sharing engine 312, and therefore may also be implemented using any suitable existing or subsequently developed authentication framework. Still other implementations omit user authentication altogether, and thus provide secure information sharing services to unregistered users, as disclosed herein. In certain embodiments an authenticated user is provided with access to the services provided by secure information sharing engine 312.

Data receiving module 316 is generally configured to facilitate the receipt and submission of data to secure information sharing engine 312. Data validation module 318 is configured to validate data for sharing with enhanced security. Data validation module 318 is provided or otherwise has knowledge of the types of data that can be shared (e.g., supported document types, supported JMOL data, supported XML data, etc.) and the rule set associated with each supported data type. As will be further described with respect to FIG. 4, data validation module 318 can validate data for sharing by applying one or more applicable validation rules against the data.

Note that secure information sharing engine 312 can be included in or otherwise provided as a stand-alone application in some embodiments, while in other embodiments may be integrated with another application programs and/or service. For instance, in an example embodiment, secure information sharing engine 312 can be integrated with other applications and/or services such as information sharing applications, trusted download applications, file sharing applications, or collaboration applications, to name a few examples.

In various embodiments, the various functionalities of secure information sharing engine 312, including user authentication module 314, data receiving module 316, and data validation module 318 may be integrated into fewer modules (e.g., one or two) or more modules (e.g., four, five or six, or more). In addition, further note that the various components of secure information sharing engine 312 may be distributed across additional machines. In some cases, one or more of user authentication module 314, data receiving module 316, and data validation module 318 may be downloaded from a server computing system onto computing system 302 for local execution. In some cases, secure information sharing engine 312 may not include one or more of the components illustrated in FIG. 3, but secure information sharing engine 312 may connect or otherwise couple to the one or more components via a communication interface. In a more general sense, the degree of integration and distribution of the functional component(s) provided herein can vary greatly from one embodiment to the next, as will be appreciated in light of this disclosure.

Methodology

Figure 4:
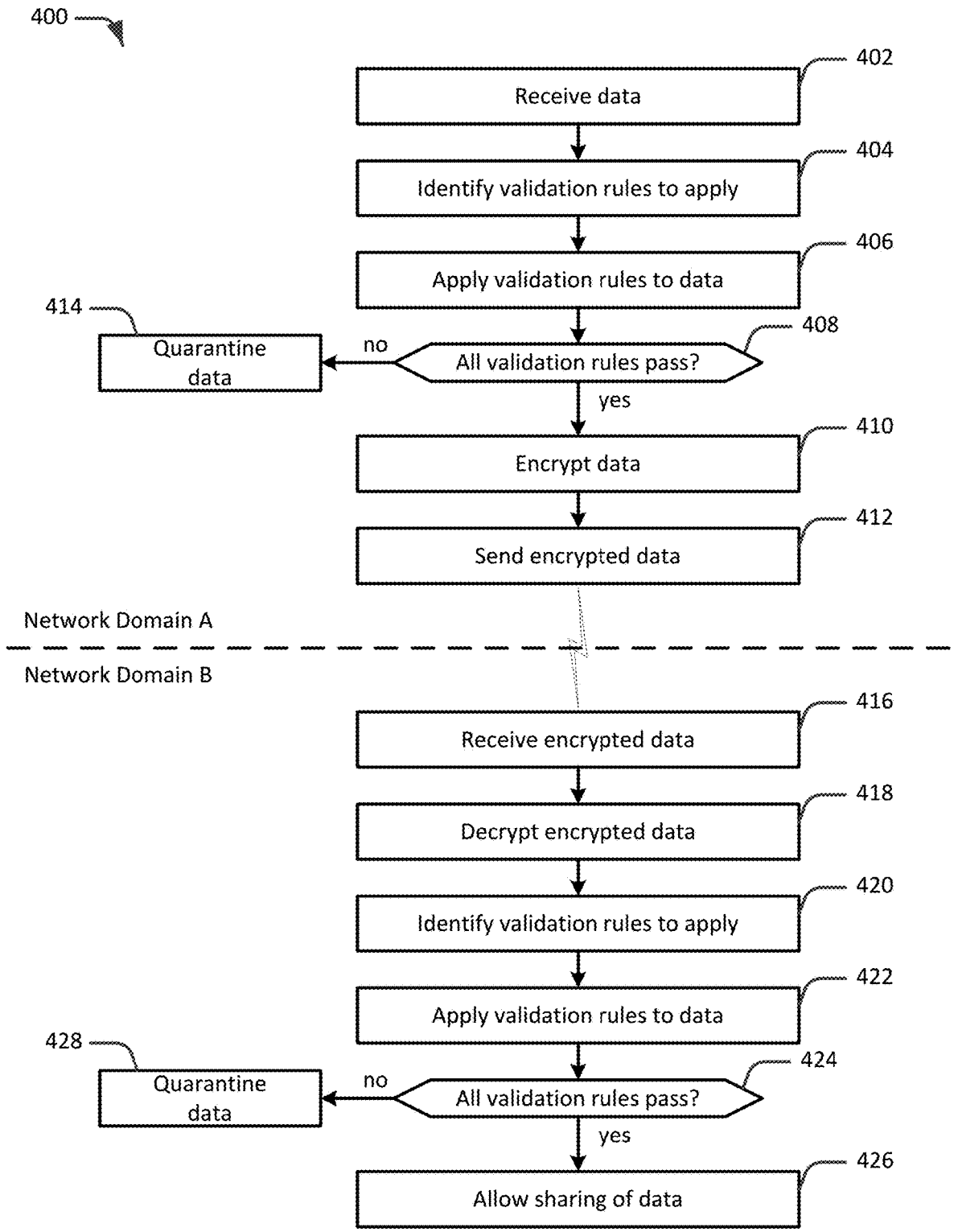
FIG. 4 is a diagram illustrating an example process for information sharing with enhanced security between a network domain A and a network domain B, in accordance with an embodiment of the present disclosure.

FIG. 4 is a diagram illustrating an example process 400 for information sharing with enhanced security between a network domain A and a network domain B, in accordance with an embodiment of the present disclosure. As shown in FIG. 4, operations 402-414 of process 400 may be performed within network domain A, and operations 416-428 may be performed within network domain B. In particular, and according to one embodiment, operations 402-414 may be performed by an instance of a secure information sharing engine executing within network domain A, and operations 416-428 may be performed by an instance of a secure information sharing engine executing within network domain B. In such embodiments, operations 402-414 of process 400 may be performed to determine whether data is to be shared with network domain B, and operations 416-428 of process 400 may be performed to determine whether data being shared by network domain A can be shared within network domain B. The operations, functions, or actions described in the respective blocks of example process 400 may be stored as computer-executable instructions in a computer-readable medium, such as memory 306 and/or data store 310 of computing system 302.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments. To this end, each of the example processes depicted is provided to give one example embodiment and is not intended to limit the process to any particular physical or structural configuration.

With reference to example process 400 of FIG. 4, at operation 402, secure information sharing engine 312 executing within network domain A receives data for sharing with network domain B. For example, in one embodiment, secure information sharing engine 312 can receive the data through data receiving module 316.

At operation 404, data validation module 318 of secure information sharing engine 312 executing within network domain A can identify the validation rules to apply to the data. For example, in one embodiment, the validation rules to apply can be identified based on the data type.

At operation 406, data validation module 318 of secure information sharing engine 312 executing within network domain A can apply the identified validation rules to the data. For example, the validation rules can be applied against data contained in (e.g., contents of) a document to be shared with network domain B.

At operation 408, data validation module 318 of secure information sharing engine 312 executing within network domain A can check to determine whether all the validation rules applied to the data pass. If it is determined that all the applied validation rules pass, then, at operation 410, data validation module 318 of secure information sharing engine 312 executing within network domain A can encrypt the data. At operation 412, data validation module 318 of secure information sharing engine 312 executing within network domain A can send the encrypted data to network domain B. In some embodiments, data validation module 318 may send the data to network domain B without first encrypting the data. In some such embodiments, data validation module 318 may send the data to another computing device or network node, such as a gateway or other suitable network node, within network domain A, and such computing device or network node can encrypt the data prior to sending to network domain B. In other embodiments, the data may be sent to network domain B without first being encrypted.

Otherwise, if it is determined that not all applied validation rules pass, then, at operation 414, data validation module 318 of secure information sharing engine 312 executing within network domain A can quarantine the failed data. In some embodiments, data validation module 318 can quarantine the failed data in an encrypted quarantine.

At operation 416, secure information sharing engine 312 executing within network domain B receives the encrypted data sent from network domain A. At operation 418, secure information sharing engine 312 executing within network domain B can decrypt the received encrypted data. In some embodiments, the encrypted data may be received by a computing device or network node, such as a gateway or other suitable network node, within network domain B other than secure information sharing engine 312. In some such embodiments, such computing device or network node can decrypt the received encrypted data and provide the decrypted data to secure information sharing engine 312 for processing. In other embodiments, the encrypted data may be received and/or decrypted by data validation module 318 of secure information sharing engine 312 executing within network domain B.

At operation 420, data validation module 318 of secure information sharing engine 312 executing within network domain B can identify the validation rules to apply to the data. For example, in one embodiment, the validation rules to apply can be identified based on the datatype.

At operation 422, data validation module 318 of secure information sharing engine 312 executing within network domain B can apply the identified validation rules to the data. For example, the validation rules can be applied against data contained in (e.g., contents of) a document received by network domain B. Here, the validation rules are being applied to the data to check for additional information that may have been hidden or otherwise put into the data during transmission of the data from network domain A to network domain B.

At operation 424, data validation module 318 of secure information sharing engine 312 executing within network domain B can check to determine whether all the validation rules applied to the data pass. If it is determined that all the applied validation rules pass, then, at operation 426, data validation module 318 of secure information sharing engine 312 executing within network domain B can allow sharing of the data within network domain B. For example, in one embodiment, data validation module 318 can send the validated data to a data sharing server.

Otherwise, if it is determined that not all applied validation rules pass, then, at operation 428, data validation module 318 of secure information sharing engine 312 executing within network domain B can quarantine the failed data. In some embodiments, data validation module 318 can quarantine the failed data in an encrypted quarantine.

In some embodiments, additional operations are performed. For example, in one embodiment, secure information sharing engine 312 executing within network domain A can authenticate the user submitting data for sharing with network domain B. If the user is not authenticated (e.g., the user is not authorized to use the secure information sharing service), secure information sharing engine 312 can quarantine the data. In another embodiment, secure information sharing engine 312 executing within network domain A can determine whether received data is of a data type that can be shared with network domain B. If the data is not of a supported data type, secure information sharing engine 312 can quarantine the data.

In still another embodiment, secure information sharing engine 312 can extract and store data from documents being processed by secure information sharing engine 312. For example, some validation rules may be based on data aggregated from multiple documents. In order to facilitate the proper application of such validation rules, the data needed by such validation rules may be extracted from the appropriate documents during or in conjunction with the processing of the documents for sharing by secure information sharing engine 312.

Further Example Embodiments

The following examples pertain to further embodiments, from which numerous permutations and configurations will be apparent.

Example 1 is a computer program product including one or more non-transitory machine-readable mediums encoding instructions that when executed by one or more processors cause a process to be carried out for secure information sharing, the process including: receiving data for sharing; identifying one or more validation rules to apply to the data, wherein at least one of the validation rules comprises a check that a portion of the data contained in multiple fields maintain a relationship between the multiple fields; applying the identified one or more validation rules to the data; in response to a determination that the applied one or more validation rules pass, allowing the sharing of the data; and in response to a determination that the applied one or more validation rules do not pass, disallowing the sharing of the data.

Example 2 includes the subject matter of Example 1, wherein the relationship between the multiple fields is a mathematical relationship.

Example 3 includes the subject matter Example 1 or 2, wherein the validation rule is based on aggregated data.

Example 4 includes the subject matter of any of Examples 1 through 3, wherein the sharing is between a first network domain and a second network domain.

Example 5 includes the subject matter of Example 4, wherein the first network domain is a secure network domain, and the second network domain is an unsecure network domain.

Example 6 includes the subject matter of Example 4, wherein the first network domain is an unsecure network domain, and the second network domain is a secure network domain.

Example 7 includes the subject matter of any one of Examples 1-6, wherein allowing the sharing of the data includes encrypting the data and sending of the encrypted data for sharing.

Example 8 includes the subject matter of any one of Examples 1-7, wherein disallowing the sharing of the data includes quarantining the data.

Example 9 is a computer implemented method to securely share information between a first network domain and a second network domain, the method including, at the first network domain: receiving data for sharing with the second network domain; identifying one or more validation rules to apply to the data, wherein at least one of the validation rules comprises a check that a portion of the data contained in multiple fields maintain a relationship between the multiple fields; applying the identified one or more validation rules to the data; in response to a determination that the applied one or more validation rules pass, allowing the sharing of the data with the second network domain; and in response to a determination that the applied one or more validation rules do not pass, disallowing the sharing of the data with the second network domain.

Example 10 includes the subject matter of Example 9, wherein the relationship between the multiple fields is a mathematical relationship.

Example 11 includes the subject matter of Example 9 or 10, wherein the validation rule is based on aggregated data.

Example 12 includes the subject matter of any one of Examples 9-11, wherein the first network domain is a secure network domain, and the second network domain is an unsecure network domain.

Example 13 includes the subject matter of any of Examples 9-11, wherein the first network domain is an unsecure network domain, and the second network domain is a secure network domain.

Example 14 includes the subject matter of any one of Examples 9-13, wherein allowing the sharing of the data includes encrypting the data and sending of the encrypted data for sharing.

Example 15 includes the subject matter of any of Examples 9-14, wherein disallowing the sharing of the data includes quarantining the data.

Example 16 includes the subject matter of any of Examples 9 through 15, wherein the method further includes, at the second network domain: receiving the data for sharing from the first network domain; identifying one or more second validation rules to apply to the data; applying the identified one or more second validation rules to the data; in response to a determination that the applied one or more second validation rules pass, allowing the sharing of the data within the second network domain; and in response to a determination that the applied one or more second validation rules do not pass, disallowing the sharing of the data within the second network domain.

Example 17 includes the subject matter of Example 16, wherein the received data is an encrypted document, and the method further includes decrypting the encrypted document.

Example 18 is a system to securely share information. The system includes one or more non-transitory machine-readable mediums configured to store instructions, and one or more processors configured to execute the instructions stored on the one or more non-transitory machine-readable mediums. Execution of the instructions causes the one or more processors to: receive data for sharing; identify one or more validation rules to apply to the data, wherein at least one of the validation rules comprises a check that a portion of the data contained in multiple fields maintain a relationship between the multiple fields; apply the identified one or more validation rules to the data; in response to a determination that the applied one or more validation rules pass, allow the sharing of the data; and in response to a determination that the applied one or more validation rules do not pass, disallow the sharing of the data.

Example 19 includes the subject matter of Example 18, wherein the relationship between the multiple fields is a mathematical relationship.

Example 20 includes the subject matter of Example 18 or 19, wherein the validation rule is based on aggregated data.

Example 21 includes the subject matter of any one of Examples 18-20, wherein the sharing is between a first network domain and a second network domain.

Example 22 includes the subject matter of Example 21, wherein the first network domain is a secure network domain, and the second network domain is an unsecure network domain.

Example 23 includes the subject matter of Example 21, wherein the first network domain is an unsecure network domain, and the second network domain is a secure network domain.

Example 24 includes the subject matter of any one of Examples 18-23, wherein allowing the sharing of the data includes encrypting the data and sending of the encrypted data for sharing.

Example 25 includes the subject matter of any one of Examples 18-24, wherein disallowing the sharing of the data includes quarantining the data.

Example 26 includes the subject matter of any one of Examples 18-25, wherein to identify one or more validation rules comprises identifying one or more validation rules based on a data type associated with the data.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer implemented method to securely share information between a first network domain and a second network domain, the method comprising:
    at the first network domain,
        receiving data for sharing with the second network domain;
        identifying one or more validation rules to apply to the data, wherein at least one of the validation rules comprises a check that a portion of the data contained in multiple fields maintain a relationship between the multiple fields;
        applying the identified one or more validation rules to the data;
        in response to a determination that the applied one or more validation rules pass, allowing the sharing of the data with the second network domain; and
        in response to a determination that the applied one or more validation rules do not pass, disallowing the sharing of the data with the second network domain.

2. The method of claim 1, wherein the relationship between the multiple fields is a mathematical relationship.

3. The method of claim 1, wherein allowing the sharing of the data comprises encrypting the data and causing the encrypted data to be sent to the second network domain.

4. The method of claim 1 further comprising:
    at the second network domain:
        receiving the data for sharing from the first network domain;
        identifying one or more second validation rules to apply to the data;
        applying the identified one or more second validation rules to the data;
        in response to a determination that the applied one or more second validation rules pass, allowing the sharing of the data within the second network domain; and
        in response to a determination that the one or more applied second validation rules do not pass, disallowing the sharing of the data within the second network domain.

5. The method of claim 4, wherein the received data is an encrypted document, and the method further comprising decrypting the encrypted document.

6. The method of claim 4, wherein the first network domain is a secure network domain, and the second network domain is an unsecure network domain.

7. The method of claim 1, wherein disallowing the sharing of the data comprises quarantining the data.

8. The method of claim 1, wherein the one or more validation rules comprises a validation rule based on aggregated received data.

9. A computer program product including one or more non-transitory machine-readable mediums encoding instructions that when executed by one or more processors cause a process to be carried out for secure information sharing, the process comprising:
    receiving data for sharing;
    identifying one or more validation rules to apply to the data, wherein at least one of the validation rules comprises a check that a portion of the data contained in multiple fields maintain a relationship between the multiple fields;
    applying the identified one or more validation rules to the data;
    in response to a determination that the applied one or more validation rules pass, allowing the sharing of the data; and
    in response to a determination that the applied one or more validation rules do not pass, disallowing the sharing of the data.

10. The computer program product of claim 9, wherein the relationship between the multiple fields is a mathematical relationship.

11. The computer program product of claim 9, wherein the one or more validation rules comprises a validation rule based on aggregated received data.

12. The computer program product of claim 9, wherein the sharing is between a first network domain and a second network domain.

13. The computer program product of claim 12, wherein the first network domain is a secure network domain, and the second network domain is an unsecure network domain.

14. The computer program product of claim 9, wherein allowing the sharing of the data comprises encrypting the data and sending the encrypted data for sharing.

15. The computer program product of claim 9, wherein disallowing the sharing of the data comprises quarantining the data.

16. A system to securely share information, the system comprising:
    one or more non-transitory machine-readable mediums configured to store instructions; and
    one or more processors configured to execute the instructions stored on the one or more non-transitory machine-readable mediums, wherein execution of the instructions causes the one or more processors configured to
        receive data for sharing;
        identify one or more validation rules to apply to the data, wherein at least one of the validation rules comprises a check that a portion of the data contained in multiple fields maintain a relationship between the multiple fields;
        apply the identified one or more validation rules to the data;
        in response to a determination that the applied one or more validation rules pass, allow the sharing of the data; and
        in response to a determination that the applied one or more validation rules do not pass, disallow the sharing of the data.

17. The system of claim 16, wherein to identify one or more validation rules comprises identifying one or more validation rules based on a data type associated with the data.

18. The system of claim 16, wherein the relationship between the multiple fields is a mathematical relationship.

19. The system of claim 16, wherein allowing the sharing of the data comprises encrypting the data and sending the encrypted data for sharing.

20. The system of claim 16, wherein the sharing is between a first network domain and a second network domain.

21. The system of claim 20, wherein the first network domain is a secure network domain, and the second network domain is an unsecure network domain.

22. The system of claim 16, wherein the one or more validation rules comprises a validation rule based on aggregated received data.

* * * * *